Oct. 17, 1950 — J. F. YOUNG — 2,526,445
AUTOMATIC WASHING MACHINE CONTROL
Filed June 19, 1948 — 2 Sheets-Sheet 1.

Inventor:
James F. Young,
by Alfred V. Sobst.
His Attorney.

Oct. 17, 1950 — J. F. YOUNG — 2,526,445
AUTOMATIC WASHING MACHINE CONTROL
Filed June 19, 1948 — 2 Sheets-Sheet 2

Inventor:
James F. Young,
by Alfred T. _____
His Attorney.

Patented Oct. 17, 1950

2,526,445

UNITED STATES PATENT OFFICE 2,526,445

AUTOMATIC WASHING MACHINE CONTROL

James F. Young, Bridgeport, Conn., assignor to General Electric Company, a corporation of New York Application June 19, 1948, Serial No. 34,103

7 Claims. (Cl. 161—1)

My invention relates to controls for a sequence of operations and more particularly to mechanisms for controlling a series of operations of automatic washing machines.

It is an object of my invention to provide an improved control for a sequence of operations including provision for adjusting the duration of one of the operations.

It is another object of my invention to provide an improved control wherein a single element is utilized for setting the apparatus control to any operation within the sequence and also for varying the duration of one of the operations.

It is a further object of my invention to provide an improved control utilizing a single motor for driving both a sequential control and an interval control.

Further objects and advantages of my invention will become apparent as the following description proceeds and the features of novelty which characterize my invention will be pointed out with particularity in the claims annexed to and forming part of this specification.

Figure 1:
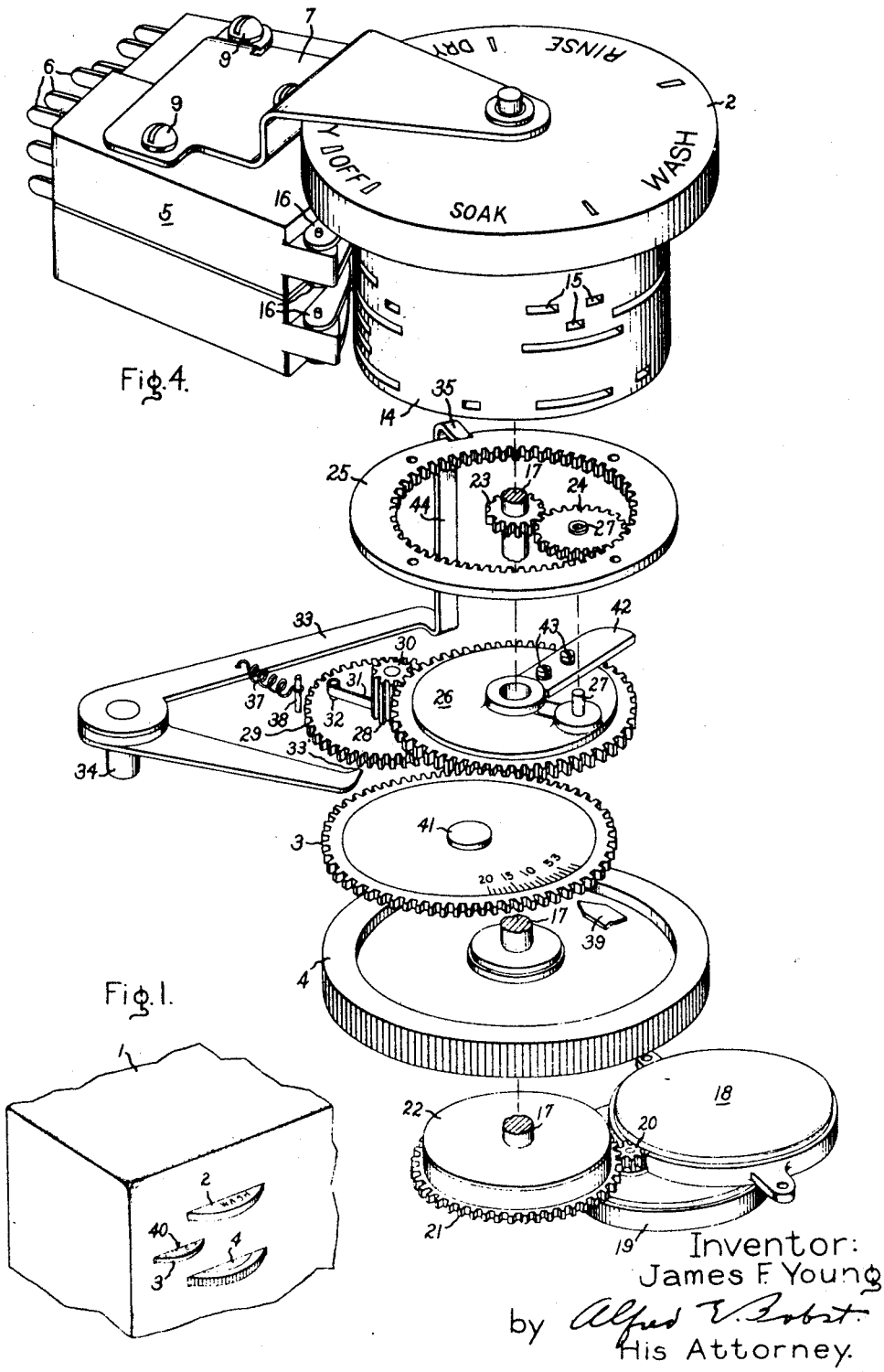
Figure 2:
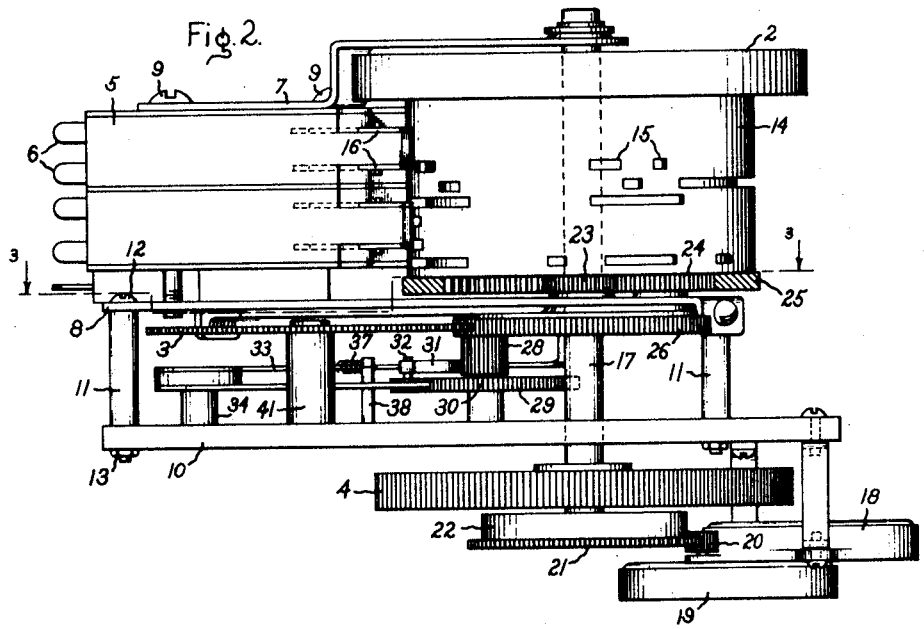
Figure 3:
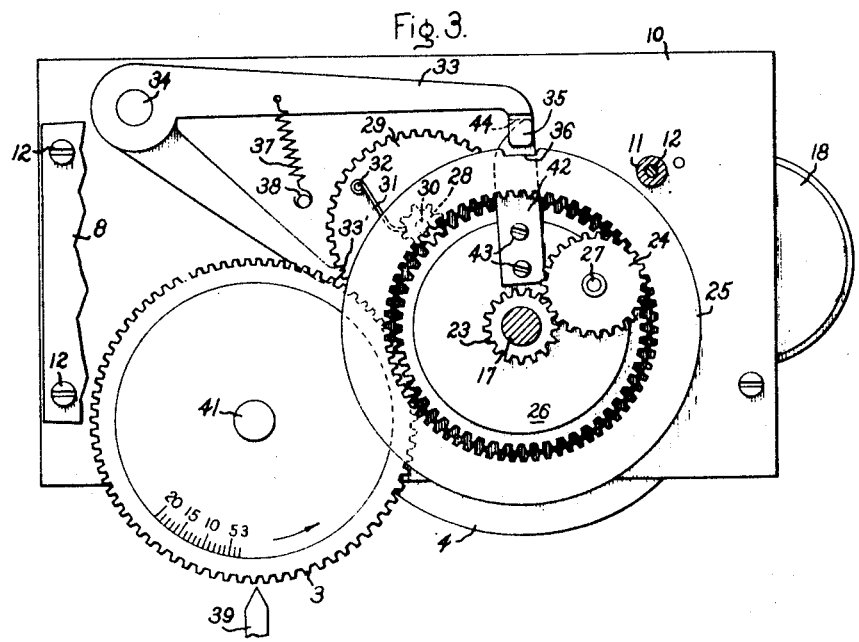

For a better understanding of my invention reference may be had to the accompanying drawings in which Fig. 1 is a perspective view of a portion of a washing machine incorporating the control; Fig. 2 is an elevational view of the control; Fig. 3 is a plan view taken along the line 3—3 of Fig. 2; and Fig. 4 is an exploded view showing details of the various elements of the control.

Referring to Fig. 1, there is shown a portion of a cabinet 1 of an automatic washing machine. The cabinet is provided near one corner with three openings through each of which projects a rotatable knob or element. One of these knobs 2 is provided with suitable inscriptions to indicate the particular operation for which the machine is set or the operation being performed at the time by the machine. A second knob or element 3 is suitably graduated to indicate the number of minutes of washing time for which the machine is set. The third knob or element 4 is utilized to adjust the position of the control, this knob, as will be explained as this specification proceeds, being utilized as a setting element to set the position of elements 2 and 3.

Referring now to Figs. 2, 3, and 4, the control includes a switch assembly which incorporates a plurality of switches (not shown) arranged within a suitable casing 5, and having a plurality of projecting plug terminals 6. The switch assembly may be of the general type described and claimed in the application of Heber L. Newell, Serial No. 665,501, now Patent No. 2,481,333, granted September 6, 1949, and assigned to the same assignee as the present invention. These terminals are adapted to be received within corresponding receptacles provided in the automatic washing machine whereby the switches may control a plurality of electrical circuits to govern the various operations to be performed by the machine. A metal bracket 7 is secured to the upper side of the switch casing 5 and a second metal bracket 8 is secured to the lower side of casing 5, the brackets 7 and 8 being secured to the switch assembly by screws 9 extending therethrough. The lower bracket 8 is supported on a mounting plate 10 by a plurality of posts 11. Bolts and nuts 12 and 13, or other suitable fastening devices, are employed to hold the bracket 8 and the mounting plate 10 in the proper relationship.

A control drum 14 having a plurality of cam faces 15 is arranged between the brackets 7 and 8. The drum 14, which acts as a sequential control, is adapted, upon rotation, to actuate, by means of cam faces or recesses, cam followers 16. These followers actuate switches (not shown) within the switch casing 5 in a predetermined sequence so as to cause the performance of various operations of the washing machine in the proper sequence and for the proper length of time. The details of the cam faces and of the circuit connections between the switches and the operating parts of the machine form no part of this invention and are matters of design to suit the particular operating characteristics of the machine.

This sequential control, whose main element in the embodiment herein described is the drum 14, determines by its angular position with reference to the respective cam followers the particular operation, if any, which at any time is being carried out by the washing machine. Such operations may, for example, include presoaking, washing, rinsing, and drying. These various operations are customarily continued for a predetermined period of time controlled by the speed of rotation of an element of the sequential control, with the exception, however, of the washing operation. The duration of the washing operation cannot conveniently be predetermined because some types of materials require longer washing than others. For this reason, the sequential control device may be stopped during the washing period and the time duration of the washing period controlled by an interrelated electrical or mechanical mechanism. Such an arrangement is relatively simple when no operations precede the washing operation. According to the present invention, however, the initial or any other one of a series of operations may be made independently adjustable by means of a separate interval control. In the described embodiment of the invention, both the interval control and the sequential control are driven by a single motor whose driving power is transferred from one control to the other by means of a variable gearing through which, moreover, both controls can be adjusted by a single adjustment element.

Referring again to the drawing, the drum 14 is mounted for rotation on a shaft 17. This shaft extends through the brackets 7 and 8 and the mounting plate 10. A motor 18 is provided for driving the drum 14 at a constant speed in order to effect the desired sequence of operations of the washing machine. Power is supplied from the motor through a gear reduction unit 19 to a pinion 20. The pinion engages a gear 21 and drives the shaft 17 through a suitable over-running clutch (not shown) within the casing 22.

The drive for the drum 14 includes a sun gear 23 which is fixed to shaft 17 and which engages a planet gear 24. The planet gear, in turn, drives a ring gear 25, which is secured directly to the drum 14 and forms a part thereof. Thus, assuming that the axis of the planet gear 24 is maintained stationary, the motor 18 effects rotation of the drum 14.

In order to support the planet gear 24 a planet cage gear 26 is mounted free on the shaft 17, and the planet cage gear includes an upwardly extending pin 27 upon which the planet gear 24 is mounted. A pawl arrangement is provided for maintaining the planet cage gear, and hence the axis of the planet gear, stationary under certain conditions. This arrangement includes a pinion 28 in engagement with the planet cage gear 26. The pinion 28 and a gear 29 are mounted for free rotation on a common shaft 30. The shaft 30 in turn is mounted on the plate 10. A pawl 31 is fixed to a pin 32, which is secured to the face of the gear 29. This pawl is arranged to prevent relative rotation between the pinion 28 and the gear 29 whenever any attempt is made to rotate the pinion 28 in a clockwise direction as viewed in Figs. 3 and 4. The pawl permits relative rotation between the pinion 28 and the gear 29 when the pinion is turned in a counterclockwise direction.

It can be seen from the above description that this arrangement prevents clockwise rotation of the pinion 28 and hence counterclockwise rotation of the planet cage gear 26, if the gear 29 is held stationary. In order to maintain the gear 29 stationary a follower 33 is provided. This follower is mounted on a shaft 34, which is secured to the mounting plate 10. The follower 33 includes a portion 35 which is adapted to engage the outer circumference of the ring gear portion 25 of the drum. The ring gear includes a suitable cam surface or recess 36. The follower is biased into engagement with the face of the ring gear by a spring 37, one end of which is secured to the follower 33 and the other end of which is secured to a pin 38 mounted on the plate 10. During substantially the entire revolution of the drum 14 it can be seen that the follower 33 is forced outwardly against the bias of the spring 37 and a tip 33' of the follower is pressed into engagement with the gear 29 to prevent rotation of the gear 29 in either direction.

For indicating to the user the state of operation of the washing machine, certain elements of the control mechanism project through openings in the cabinet 1. Thus, the drum 14 includes the knob 2, which is marked with suitable inscriptions to indicate the various operations of the machine. The knob 3 is arranged in engagement with the planet gear 26 and is provided with a suitable numerical inscription to indicate the number of minutes of washing time, that is, the duration of the washing operation. In Figs. 3 and 4 a pointer 39 has been superimposed to indicate the corresponding mark 40 on the cabinet 1. The knob 3 is supported on the plate 10 on a suitable mounting post 41.

By my invention a single element is employed for setting the washing machine at any desired point in the sequence of operations and also for setting the duration of the washing operation. This is accomplished by the hand-operated knob 4 which is mounted on the shaft 17 and is keyed to the shaft for rotation therewith, the knob 4 being accessible from the exterior of the cabinet as shown in Fig. 1. The arrangement for setting the control for proper operation of the washing machine is as follows. Normally, at the time the washing machine is to be placed in operation, the portion 35 of the follower is out of the recess 36 and the tip 33' is in engagement with a tooth of the gear 29. The gear 29 is therefore maintained stationary and, because of the pawl 31, clockwise rotation of the pinion 28 and counterclockwise rotation of the planet cage gear 26 is prevented. Under these circumstances, to effect a setting of the desired duration of the washing operation, that is, to set the interval control, the knob 4 is moved toward the left, that is, in a clockwise direction as viewed in Figs. 3 and 4. This rotates the sun gear 23 in a clockwise direction and the planet gear 24 in a counterclockwise direction. The planet gear 24 tends to roll around the ring gear 25 and to cause clockwise rotation of the planet cage gear 26 and counterclockwise rotation of the pinion 28. The planet gear 24 moves about the ring gear 25 carrying the planet gear axis in a clockwise direction instead of maintaining its axis stationary and driving the ring gear in a counterclockwise direction, because the friction load imposed by the plurality of switches in the switch casing 5 on the drum 14 substantially exceeds the relatively slight resistance exerted by the pawl 31 against counterclockwise rotation of the pinion 28. Accordingly, it can be seen that when the knob 4 is moved in a clockwise direction the planet cage gear 26 is moved in a clockwise direction. This is accomplished even though rotation of the gear 29 is prevented by the tip 33' of the follower 33. As the planet cage gear 26 is moved in a clockwise direction during the setting of the washing time, an arm 42, which is secured to the planet cage gear 26 by screws 43 or other suitable fastening devices, is also moved in the same direction. This moves the arm 42 away from the follower 33 and thereby determines the duration of the washing operation, as will be explained hereinafter. At the same time clockwise movement at the planet cage gear 26 causes movement of the indicator knob 3 in a counterclockwise direction to indicate the number of minutes for which the washing operation is set, the knob 3 being driven by gear 26 through meshing gear teeth. Although the knob 3 has been shown with its gear teeth extending through the opening in the cabinet, it will be apparent that, if desired, the knob similar to knob 4 and of somewhat larger diameter than knob 3 could be secured to knob 3 and arranged to project through the opening in the cabinet, the entire knob 3 being concealed within the cabinet.

The control is positioned for the desired operation in the series of operations by moving the hand-operated knob 4 to the right, that is, in a counterclockwise direction. This rotates the planet gear 24 in a clockwise direction. The axis of the planet gear 24 is held stationary under these circumstances since any tendency of the planet gear to roll around the ring gear and carry its axis in a counterclockwise direction is resisted by the pawl 31 which prevents clockwise rotation of the pinion 28. The gear 29, and hence the pawl 31, being held stationary by the tip 33' of the follower 33, counterclockwise movement of the planet cage gear 26 is prevented. Accordingly, the counterclockwise movement of the knob 4 moves the planet gear 24 in a clockwise direction about its own axis, and this gear in turn drives the ring gear and the drum 14, of which the ring gear forms a part, in a clockwise direction. Thus the counterclockwise movement of the setting knob or element 4 can be utilized to shift the sequential control from the "off" position to start the washing machine in operation, and it can be further utilized to advance the washing machine through any of the subsequent operations.

The operation of the control is as follows. The machine is started by shifting the sequential control including the drum 14 from the off position by moving the knob 4 counterclockwise. At the start of the operation of the washing machine the portion 35 of the follower 33 is in engagement with the face of the ring gear 25 at a portion other than the recess 36 since, by the construction of the mechanism, the recess 36 comes opposite the portion 35 of the follower only when the control has rotated to the "wash" position. Accordingly the tip 38 of the follower is forced into engagement with the gear 29 and maintains the gear 29 stationary. The motor drives the shaft 17 and the sun gear 23 in a counterclockwise direction. As explained previously in describing the setting operation, when the sun gear 23 moves in a counterclockwise direction the planet cage gear is prevented from rotation in a counterclockwise direction by the pawl 31. Accordingly, the sun gear 23 drives the planet gear 24 in a clockwise direction and the planet gear in turn drives the drum 14 in a clockwise direction through engagement with the ring gear portion 25 of the drum.

Rotation of the drum 14 continues until the washing operation is reached. At this point the recess 36 on the ring gear portion of the drum 14 will have reached a point opposite the portion 35 of the follower 33, and the follower is pulled into the recess by the spring 37. This moves the tip 33' of the follower out of engagement with the gear 29 and permits free movement of this gear and corresponding free movement of its associated pinion 28. Under these circumstances the planet cage gear 26 is free to move in a counterclockwise direction. Since rotation of the ring gear 25 and of the drum 14 of which the ring gear forms an integral portion is prevented by the portion 35 of the follower, the clockwise rotation of the planet gear 24 is translated into a movement of the planet gear 24 and its axis around the circumference of the ring gear 25 in a counterclockwise direction. The planet cage gear 26 drives the knob 3 during this period so that knob 3 indicates the time remaining of the washing operation. The arm 42, which is secured to the gear 26, is moved in a counterclockwise direction until it reaches the position shown in Fig. 3, wherein the arm has come into engagement with a portion 44 of the follower 33, thereby terminating the washing operation, as will be explained below. It can be seen, therefore, that the duration of the washing operation is determined by the distance traveled by the arm 42 before engaging the follower 33 and hence is governed by the distance the planet cage gear 26 is rotated in a clockwise direction during the setting of the duration of the washing period.

Returning to the description of the operation of the control, when the arm 42 engages the portion 44 of the follower it moves the portion 35 of the follower out of engagement with the recess 36 and at the same time forces the tip 33' of the follower into engagement with the gear 29 to maintain the gear 29 stationary. Clockwise rotation of the planet cage gear 26 is again prevented, as in the situation preceding the washing operation, and the motor 18 again drives the drum 14 through the sun, planet, and ring gears 23, 24, and 25, respectively, to complete the series of operations of the washing machine.

The setting knob 4 may be moved in a clockwise direction at any point in the cycle of operations to set the washing time or to increase a previous setting of the washing time. The washing time can be decreased or eliminated only during the washing operation, or at least when the sequential control has been advanced manually to the "wash" position. The setting knob 4 may be turned in a counterclockwise direction at any point in the cycle of operations for advancing the sequential control. In this latter situation the washing time setting remains unchanged until the sequential control is advanced to the "wash" position. Further movement of the setting knob then "runs out" the washing time setting.

From the foregoing description it can be seen that I have provided a control wherein a single motor 18 is utilized to drive both a sequential control for a series of operations and an interval control which varies the duration of one of the series of operations. I have further provided an arrangement for setting the control wherein a single operating element or knob 4 is utilized both for setting the duration of one of the sequence of operations and for positioning the control at the desired point in the sequence.

While I have shown and described a specific embodiment of my invention as applied to an automatic clothes washing machine, I do not desire my invention to be limited to the particular construction shown, and I intend, by the appended claims, to cover all modifications within the spirit and scope of my invention.

What I claim as new and desire to secure by Letters Patent of the United States is:

1. In combination, a sequential control for a series of operations, a motor, a gear train including a sun gear, a planet gear and a ring gear connecting said motor and said control, means for holding the axis of said planet gear stationary whereby said planet gear moves said ring gear to drive said control, means for rendering said holding means ineffective whereby said planet gear travels on said ring gear and said control remains stationary in one of said series of operations, means for again rendering said holding means effective, and means for adjustably setting said last-named means to control the duration of said one of said series of operations.

2. In combination, a sequential control operable upon rotation to program a series of operations, an interval control for governing the duration of one of said operations, a timer motor, a planetary gear system driven by said motor and having a component effective upon securement against rotation to cause said motor to drive said sequential control and upon release to cause said motor to drive said interval control, and detent means effective in a first position for holding said gear system component stationary for operation of said sequential control and effective in a second position to release said component for operation of said interval control, said sequential control including means for operating said detent means from said first position to said second position, and means operated by said interval control for engagement with said detent means after a predetermined interval for restoring the same to its said first position.

3. In combination, a sequential control operable upon rotation to program a series of operations, a timer motor, a gear system between said motor and said control for transmitting motor torque thereto, said gear system including a sun gear driven by said motor and a planet gear in driving relation between said sun gear and a driven gear on said control, means mounting said planet gear shaft for rotation about said driven gear axis for idle rotation of said planet gear relative to said driven gear, detent means operable between positions respectively restraining rotation of said planet gear shaft mount or said control, said first restraining position establishing said planet gear in driving status and the second position establishing the gear in idly rotating status, means normally establishing said detent in said first position, means effective upon rotation of said control to a position representing one of said series of operations to operate said detent from the first to the second position, and means driven at a timed rate during idle operation of said planet gear to release said control to return said detent to said first-named position for reestablishing the driving relationship between said motor and said sequential control.

4. In combination, a sequential control operable upon rotation to program a series of operations, a timer motor, a gear system between said motor and said control for transmitting motor torque thereto, said gear system including a sun gear driven by said motor and a planet gear in driving relation between said sun gear and a driven gear on said control, means mounting said planet gear shaft for displacement about said driven gear axis for idle rotation of said planet gear relative to said driven gear, detent means operable between positions respectively permitting or restraining such displacement to establish said planet gear in idling or driving status, means effective upon rotation of said control to a position representing one of said series of operations to position said detent for idle planet gear operation, means driven at a timed rate during such idle operation to position said detent to restore said planet gear to driving status, and manually operable means for displacing said restoring means relative to said detent to establish a desired time interval during which said planet gear will be idly operating.

5. In combination, a drive shaft driven by a timer motor, a sequential control operable upon rotation to program a series of operations, an interval control effective to establish the duration of one of said operations, said controls each being mounted on said shaft for free rotation thereon, a sun gear on said shaft, a planet gear in driving relation between said sun gear and a driven gear on said sequential control to transmit motor torque to said control, said planet gear shaft being carried by said interval control for rotation therewith about said drive shaft, detent means restraining rotation of said sequential control relative to said interval control to permit said sun gear to rotate said interval control through said planet gear, a second detent means effective to restrain rotation of said interval control to permit said planet gear to drive said sequential control, means effective upon rotation of said sequential control to a position representing one of said series of operations to establish said first detent means in restraining position while releasing said second detent means for operation of said interval control independently of said sequential control, means driven by said interval control to release said sequential control and reestablish restraint of movement of said interval control about said drive shaft to restore the driving relationship between said planet gear and said sequential control, and manually operable means for positioning said last-named means to establish the desired time interval during which said sequential control will be held against rotation and thus establish the duration of said one operation.

6. In combination, a drive shaft driven by a timer motor, a sequential control effective upon rotation to program a plurality of operations in sequence, an interval control effective to establish the duration of one of said operations, said controls each being mounted on said shaft for free rotation thereon, a sun gear on said shaft, a planet gear in driving relation between said sun gear and a driven gear on said sequential control to transmit motor torque to said control, said planet gear shaft being carried on said interval control for rotation therewith about said drive shaft, means frictionally restraining rotation of said sequential control relative to said interval control to permit said sun gear to rotate said interval control through said planet gear, detent means releasably engageable with said interval control to restrain rotation thereof to permit said planet gear to drive said sequential control, means effective upon rotation of said sequential control to a position representing one of said series of operations to operate said detent for release of said interval control for rotation independently of said sequential control, means driven by said interval control to position said detent means for reengagement with said interval control to restore the driving relationship between said planet gear and said sequential control, and manually operable means operatively associated with said shaft means and effective upon rotation in one direction for displacing said restoring means relative to said detent to establish a desired time interval during which said sequential control will be inoperative and upon rotation in another direction to advance said sequential control to a desired operation of the series, said interval control having a further detent restraining movement thereof during advance of said sequential control.

7. In combination, a sequential control for establishing the duration of a plurality of operations to be performed in timed sequence, an interval control for governing the duration of one of said operations, a timer motor for driving said sequential control and said interval control, a planetary gear train for connecting said motor with said controls, said gear train including a planet gear common to both controls, a drive shaft driven in one direction by said motor for operation of said gear train, means for optionally holding either said sequential or said interval control against movement whereby said planet gear is then operative to drive the free control, means effective upon rotation of the interval control in its motor-driven direction to release the sequential control and restrain the interval control, means for manually rotating said drive shaft in either direction, means effective upon manual rotation of said drive shaft in one direction to hold said interval control stationary for rotation of said sequential control to a desired operative position, and means effective upon manual rotation of said drive shaft in the other direction to rotate said interval control relative to said sequential control to establish a desired position of the sequential control release means for preselecting the duration of an operation in said series of operations.

JAMES F. YOUNG.

REFERENCES CITED

The following references are of record in the file of this patent:

UNITED STATES PATENTS

| Number | Name | Date |
| --- | --- | --- |
| 1,508,529 | Porter | Sept. 16, 1924 |
| 2,130,405 | Andrews | Sept. 20, 1938 |
| 2,155,271 | Jones | Apr. 18, 1939 |
| 2,209,108 | Briggs | July 23, 1940 |
| 2,212,868 | Strong | Aug. 27, 1940 |
| 2,232,519 | Goff | Feb. 18, 1941 |
| 2,374,590 | Dunham | Apr. 24, 1945 |
| 2,376,901 | Clark | May 29, 1945 |
| 2,467,848 | Newell | Apr. 19, 1949 |
| 2,470,003 | Thomas | May 10, 1949 |